(12) United States Patent
Ravishankar et al.

(10) Patent No.: US 10,813,078 B2
(45) Date of Patent: Oct. 20, 2020

(54) SATELLITE PAGING EFFICIENCY

(71) Applicant: Hughes Network Systems, LLC, Germantown, MD (US)

(72) Inventors: Channasandra Ravishankar, Clarksburg, MD (US); Deepak Arur, Vienna, VA (US); Gaguk Zakaria, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/235,465

(22) Filed: Dec. 28, 2018

(65) Prior Publication Data

US 2019/0268874 A1 Aug. 29, 2019

Related U.S. Application Data

(60) Provisional application No. 62/634,471, filed on Feb. 23, 2018.

(51) Int. Cl.
| | |
|---|---|
| *H04W 24/00* | (2009.01) |
| *H04W 68/02* | (2009.01) |
| *H04B 7/185* | (2006.01) |
| *H04W 4/029* | (2018.01) |
| *H04W 68/04* | (2009.01) |

(52) U.S. Cl.
CPC ........ *H04W 68/02* (2013.01); *H04B 7/18513* (2013.01); *H04W 4/029* (2018.02); *H04W 68/04* (2013.01)

(58) Field of Classification Search
None
See application file for complete search history.

(56) References Cited

U.S. PATENT DOCUMENTS

| | | | | |
|---|---|---|---|---|
| 6,424,831 B1* | 7/2002 | Schiff | ................ | H04B 7/18567 455/12.1 |
| 2002/0019241 A1* | 2/2002 | Vialen | .................. | H04W 68/00 455/458 |
| 2009/0181672 A1* | 7/2009 | Horn | ..................... | H04W 68/06 455/435.1 |
| 2010/0190514 A1* | 7/2010 | Laroia | ................. | H04W 68/025 455/458 |
| 2011/0092205 A1* | 4/2011 | Masuda | ............... | H04W 60/04 455/435.1 |
| 2012/0094683 A1* | 4/2012 | Yoeli | ..................... | G01S 5/0027 455/456.1 |
| 2014/0221005 A1* | 8/2014 | Marshall | ................. | G01S 5/021 455/456.1 |
| 2014/0362752 A1* | 12/2014 | Jha | ........................ | H04W 36/22 370/311 |

(Continued)

OTHER PUBLICATIONS

Seo-WO_2014-098338_A1-06-26-2014.pdf (Year: 2014).*
Akcin-WO_2016-168095_A1-10-20-2016.pdf (Year: 2016).*

*Primary Examiner* — Jinsong Hu
*Assistant Examiner* — Alexander J Yi
(74) *Attorney, Agent, or Firm* — Bejin Bieneman PLC

(57) ABSTRACT

A base station computer that includes a processor and memory storing instructions executable by the processor is described. The processor may be programmed to: determine a geographic position of a user terminal (UT); store the position in the memory; determine to page the UT; correlate a satellite beam based on the position; and page the UT via the satellite beam.

18 Claims, 10 Drawing Sheets

(56) References Cited

U.S. PATENT DOCUMENTS

| | | | |
|---|---|---|---|
| 2016/0142880 A1* | 5/2016 | Talluri | H04W 4/025 |
| | | | 455/456.1 |
| 2017/0303237 A1* | 10/2017 | Zhang | H04W 68/02 |
| 2017/0311247 A1* | 10/2017 | Qi | H04W 68/04 |
| 2019/0045351 A1* | 2/2019 | Zee | H04W 8/06 |

* cited by examiner

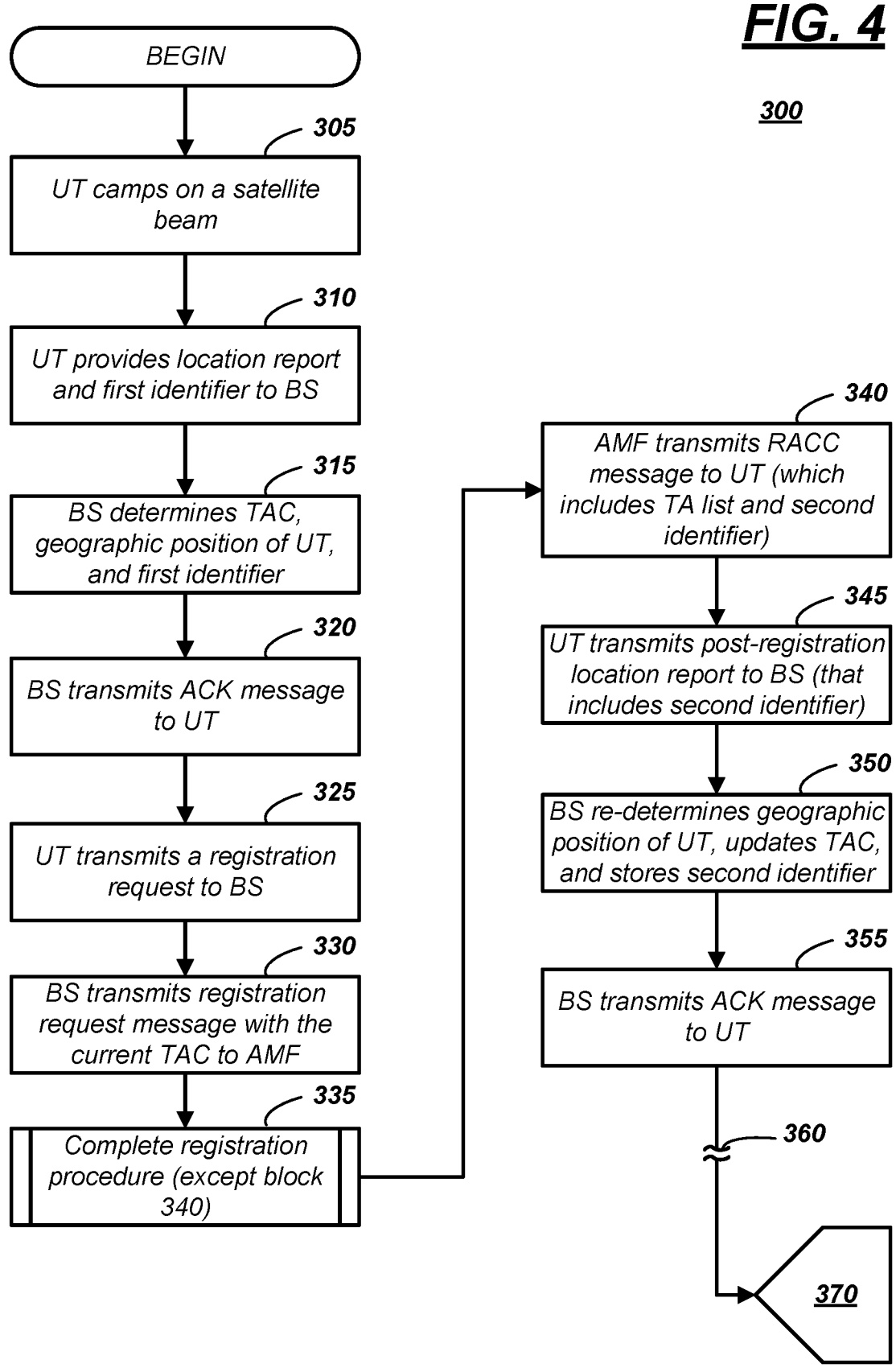

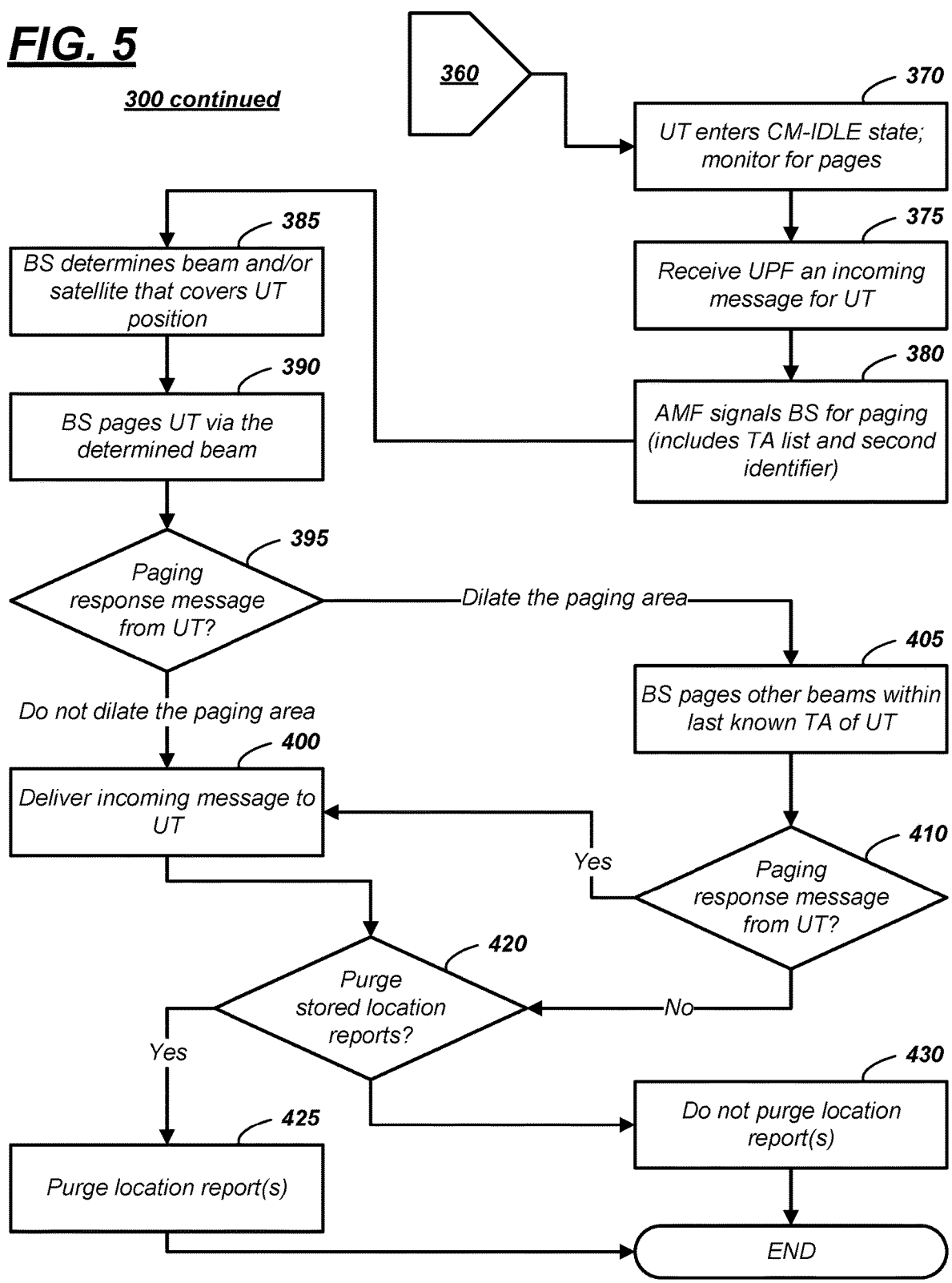

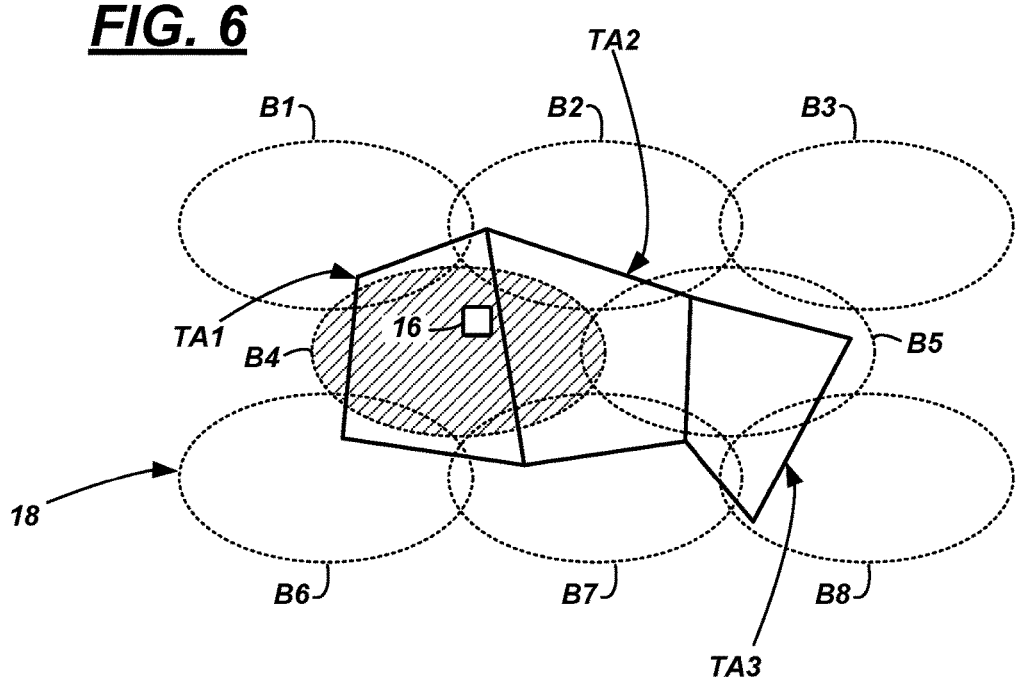
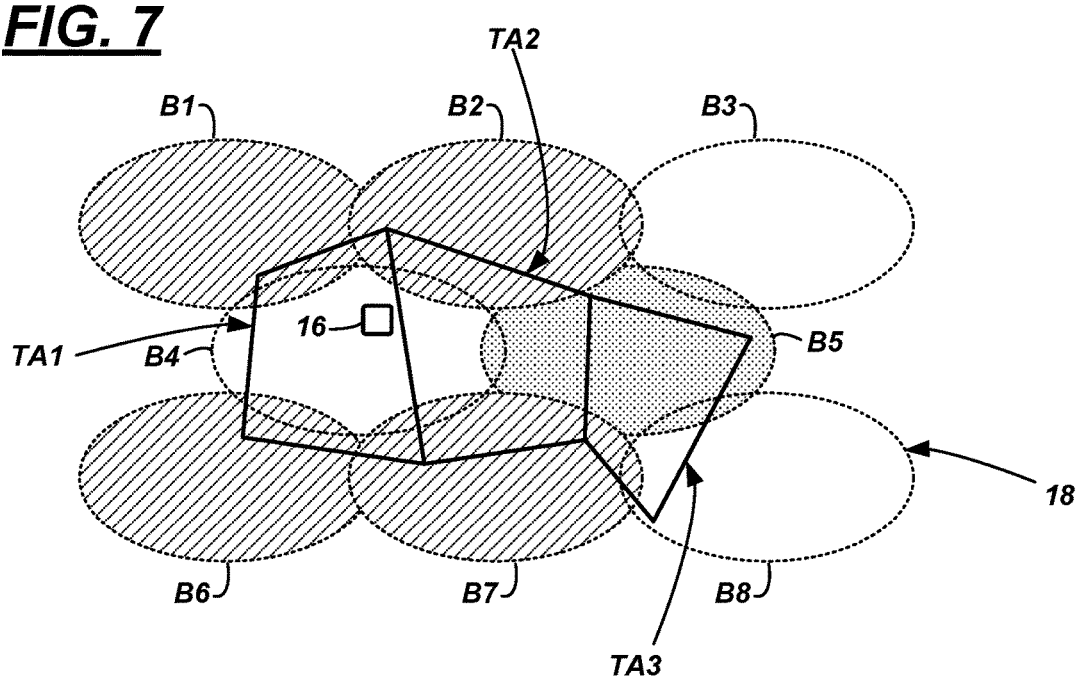

800

SATELLITE PAGING EFFICIENCY

CROSS-REFERENCE TO RELATED APPLICATIONS

This patent application claims priority to and all the benefits of U.S. Provisional Patent Application No. 62/634,471 filed on Feb. 23, 2018, which is herein incorporated by reference in its entirety.

BACKGROUND

In satellite technology, a radio access network may page a terminal device using multiple satellite beams. Since the terminal device may be located within a single satellite beam, a number of these pages may not reach the terminal device. Accordingly, a technique for reducing such satellite traffic is desirable.

BRIEF DESCRIPTION OF THE DRAWINGS

FIGS. 4-5 is a flowchart diagram that corresponds with the connection flow diagram of FIG. 3 and that illustrates a process executed, at least in part, by the UT, the satellite base station, the AMF, the UPF, and/or the SMF.

FIG. 6 illustrates the satellite beam footprints and tracking areas shown in FIG. 2, wherein one of the footprints is highlighted.

FIG. 7 illustrates the satellite beam footprints and tracking areas shown in FIG. 2, wherein several of the footprints are highlighted.

DETAILED DESCRIPTION

Figure 1:
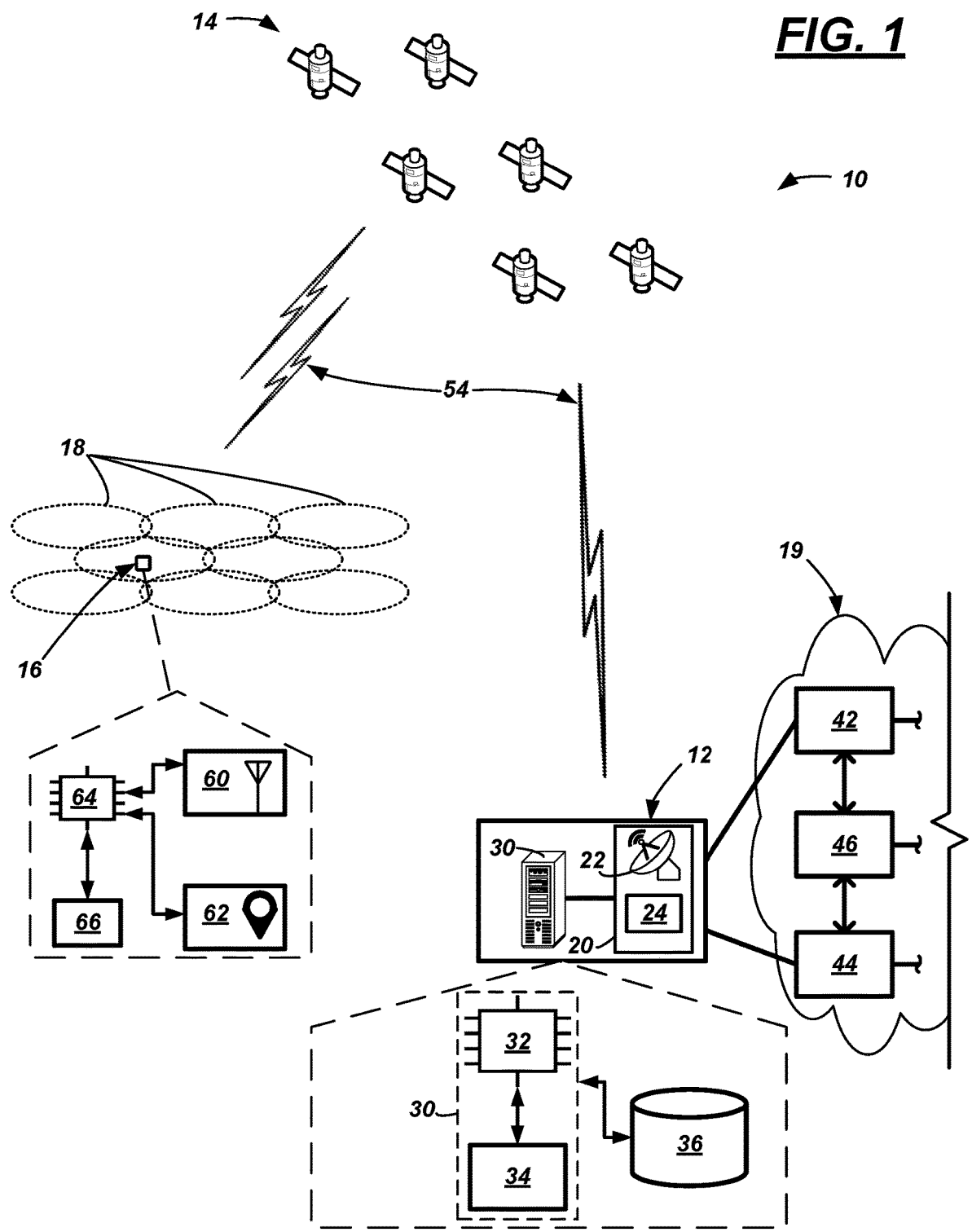
FIG. 1 illustrates an example of a satellite communication system.

According to an illustrative example, a satellite communication system is described that includes a satellite base station and a constellation of satellites. The base station may comprise a computer. And the computer may have a processor and memory storing instructions executable by the processor, and the instructions may include, to: determine a geographic position of a user terminal (UT); store the position in the memory; determine to page the UT; correlate a satellite beam based on the position; and page the UT via the satellite beam.

According to the at least one example set forth above, the instruction to determine the geographic position comprises receiving a location report from the UT.

According to the at least one example set forth above, the location report comprises coordinate data.

According to the at least one example set forth above, the location report comprises a transmission timing and/or frequency information from the UT, and the instructions further comprise, to: calculate the geographic position using the transmission timing and/or frequency information.

According to the at least one example set forth above, the instructions further comprise, to: determine a tracking area code (TAC) using the determined geographic position; and transmit the TAC to the UT.

According to the at least one example set forth above, the instructions further comprise, to: broadcast a set of vertices of the TAC to the UT so that the UT, when it is capable of determining (e.g., measuring or acquiring) its own position, may determine within which of any neighboring tracking areas it lies within and thereby indicate this to the base station. In this scenario, the base station may be capable of reporting an accurate tracking area identifier to an Access Management Function (AMF).

According to the at least one example set forth above, the instructions further comprise, to: transmit a derivation of the TAC to a core network.

According to the at least one example set forth above, the instructions further comprise, to: prior to determining to page the UT, receive an identifier from the UT; and store the identifier with the geographic position.

According to the at least one example set forth above, the identifier is a System Architecture Evolution (SAE) Temporary Mobile Subscriber Identity (S-TMSI).

According to the at least one example set forth above, the instruction to determine to page the UT is based on receiving an incoming message for the UT that includes a tracking area list and an identifier of the UT.

According to the at least one example set forth above, the instruction to determine to page the UT comprises receiving an incoming Radio Resource Control (RRC) message.

According to the at least one example set forth above, the instructions further comprise, to: receive a location report from the UT, wherein the location report is used to determine the geographic position; store the location report; and purge the location report based on a time parameter.

According to the at least one example set forth above, the satellite beam is associated with a satellite in a geostationary satellite orbit (GSO) or a non-geostationary satellite orbit (NGSO).

According to the at least one example set forth above, the instructions further comprise, to: determine whether a paging response message is received from the UT; and when no paging response message is received, then command an increase in transmission power during paging.

According to the at least one example set forth above, the instructions further comprise, to: determine whether a paging response message is received from the UT; and when no paging response message is received, then dilate the paging area.

According to the at least one example set forth above, wherein dilating the paging area comprises an instruction to: page the UT using other satellite beams which the computer correlates to a tracking area defined by the determined geographic position.

According to another illustrative example, a user terminal comprises: a processor and memory storing instructions executable by the processor, the instructions comprising, to:

camp on a satellite beam; transmit a location report to a base station; and receive, from a base station, a page based on the location report.

According to the at least one example set forth above, the location report comprises coordinate data indicating a current geographic position of the user terminal.

According to the at least one example set forth above, the instructions further comprise, to: register with a core network; and then, transmit to the base station a System Architecture Evolution (SAE) Temporary Mobile Subscriber Identity (S-TMSI).

According to the at least one example set forth above, the page is based on an incoming message for the user terminal from a core network or wherein the page is based on an incoming Radio Resource Control message for the user terminal.

According to the at least one example set forth above, the page is received at the user terminal when the user terminal is in a Connection Management (CM)-Idle state or a Radio Resource Control (RRC)-Inactive state.

According to another illustrative example, a method includes: determining a geographic position of the UT; storing the position in memory; determining to page the UT; correlating a satellite beam based on the position; and paging the UT via the satellite beam.

According to at least one example of the method, the method further comprises: when the UT does not respond, executing paging dilation, amplifying the power during paging, or performing both (e.g., sequentially).

According to at least one example of the method, the UT may periodically report its position to the base station—e.g., based on a timing scheme or physical displacement from a previous position.

Any of the method examples set forth above may be combined with one another according to any suitable combination.

According to at least one example, a computer is disclosed that is programmed to execute any combination of the method examples set forth above.

According to at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the method examples set forth above.

With reference to the figures, wherein like numerals indicate like parts throughout the several views, a satellite communication system 10 is described that reduces wireless paging traffic and permits satellite base station resources to operate more efficiently. The system 10 comprises a satellite base station (BS) 12 and a constellation of satellites 14 adapted to communicate with the base station 12 and a plurality of user terminals (UTs) 16 (only one UT is shown, for purposes of example). More particularly, as illustrated in FIG. 1, the system 10 enables the base station 12 to reduce the number of satellite beams that is uses to page UT 16—e.g., when UT 16 is in a paging mode (i.e., camped on a satellite beam, monitoring for pages, but not actively engaged in a call or connection). FIG. 1 illustrates satellite beam footprints 18—i.e., each footprint 18 is associated with a different satellite 14 and represents a ground area of satellite beam coverage. Due to the non-stationary nature of some satellite beams (relative to earth), paging in these circumstances typically occurs over multiple satellite beams based on an approximated location of the selected UT 16 (e.g., presuming that the UT 16 is located within a known registration area); however, registration areas may extend over multiple beams. Accordingly, multiple beams may be required to page UT 16. Following a description of the components of the satellite communication system 10, processes are described wherein the base station 12 determines a more precise location of the UT 16, and as a result, the base station 12 may page the UT 16 when it is in a paging mode using a single beam 18. Consequently, a volume of satellite paging data is minimized (thereby freeing up satellite resources for other data throughput) and thereby improving the overall efficiency of the system 10.

As shown in FIG. 1, satellite base station 12 (also referred to as a radio access network (RAN)), among other things, is configured to connect the UT 16 to a core network 19 (discussed below) using the satellite(s) 14. Base station 12 comprises a transceiving device 20 (that includes one or more antennas 22 and electronics 24) and a computer 30 (that comprises one or more processors 32 and memory 34—the processor(s) 32 being coupled communicatively to the memory 34 and/or one or more databases 36). It should be appreciated that while one base station (12) is shown, satellite communication system 10 may comprise multiple base stations. In at least one example, each base station is identical; therefore, only one base station will be described in detail.

In at least one example, antenna(s) 22 may be identical—therefore, only one will be described. Antenna 22 may be any suitable device for transmitting wireless satellite signals such as uplinks (transmissions to satellites 14) and/or receiving wireless satellite signals such as downlinks (transmissions from the satellites 14). According to one example, antenna 22 operates in a large range of frequencies (e.g., between 3 and 30 GigaHertz (GHz)). Other antenna examples are also possible.

Electronics 24 of transceiving device 20 may comprise suitable electronic hardware components and/or software controllers for receiving an incoming satellite signal, conditioning the incoming signal, interpreting the incoming signal, preparing an outgoing satellite signal, conditioning the outgoing signal, and transmitting the outgoing signal. Non-limiting examples of electronics 24 include amplifier (s), intermediate frequency mixers, frequency filters, analog-to-digital and digital-to-analog converters, channelizers, demodulators and decoders, and the like (none of which are shown). Arrangements of electronics 24, as well as techniques for employing such electronics 24 with antenna(s) 22, are known to skilled artisans.

Computer 30 may be representative of a single computing device or multiple (often networked) computing devices (each of which may comprise corresponding processors and memory). In the latter instance, some computing devices may be configured to perform unique or dedicated tasks of the base station 12. In other examples, some of the computing devices may be configured with redundant operations and serve to back-up primary computing devices. In at least one example, each computing device has similar or identical hardware (at least one processor and memory); thus, only one arrangement will be described.

Processor 32 comprises can be any type of device capable of processing electronic instructions, non-limiting examples including a microprocessor, a microcontroller or controller, an application specific integrated circuit (ASIC), etc.—just to name a few. Processor 32 may be dedicated to base station 12, or it may be shared with other base stations. As will be apparent from the description that follows, computer 30 may be programmed to carry out at least a portion of the process described herein. For example, among other things, computer 30 can be programmed to execute digitally-stored instructions which may be stored in memory 34 and which enable the base station 12 to store a more precise location of UT 16 (e.g., referred to below as a geographic position) and conserve satellite communication resources by paging the UT 16—in some cases—via a single satellite beam 18. These instructions will be described in greater detail below.

Memory 34 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, compact disc read-only memory (CD-ROM), a digital video disc (DVD), any other optical medium, paper tape, any other physical media with patterns of holes, random-access memory (RAM), programmable read-only memory (PROM), erasable programmable read-only memory (EPROM), electrically erasable programmable read-only memory (EEPROM), any other flash memory, any other memory chip or cartridge, or any other medium from which a computer can read. As discussed above, memory 34 may store one or more computer program products which may be embodied as software, firmware, or the like. And as will be explained in greater detail below, memory 34 may store: a current geographic position of the UT 16 and one or more corresponding identifiers (e.g., an S-TMSI or System Architecture Evolution (SAE)-Temporary Mobile Subscriber Identity, a Radio Network Temporary Identifier (RNTI), or the like).

The database 36 of base station 12 may store, among other things, satellite communication data in a filing system. One database 36 is shown; however, multiple similarly-configured databases may be used instead. Database 36 may be coupled communicatively to computer 30 and may comprise any suitable volatile and/or nonvolatile memory devices, such as some of those listed above by way of example. Alternatively, or in addition to storage in memory 34, database(s) 36 may store in nonvolatile memory devices (for each of a plurality of UTs 16): a last known geographic position and one or more corresponding identifiers (e.g., an S-TMSI, an RNTI, or the like).

Base station 12 may be coupled communicatively to core network 19 which may comprise elements of a conventional cellular network—including but not limited to a Serving General Packet Radio Services (GPRS) Support Node (SGSN). For example, 3G networks further may include additional SGSNs, Gateway GPRS Support Nodes (GGSNs), Home Location Registers (HLRs), Authentication Centers (AuCs), and the like. The core network 19 further may include any suitable components of 1G, 2G, 4G, 5G, to-be-determined-G, networks and interface components therebetween as well—all of which are known to skilled artisans.

In at least one example, core network 19 comprises, among other things, 3GPP fifth generation (5G) computers programmed to execute algorithms and functions such as an Access and Mobility Management Function (AMF) 42, a User Plane Function (UPF) 44, and a Session Management Function (SMF) 46. For example, AMF 42 supports registration management, connection management (e.g., between UT 16 and other devices), reachability management, mobility management, and various functions pertaining to security and access management and authorization. And for example, UPF 44 supports features and capabilities to facilitate user plane operation (e.g., including but not limited to packet routing and forwarding, interconnection to other aspects of the core network 19, policy enforcement, and data buffering). And for example, SMF 46 is adapted to support subscriber sessions (e.g., session establishment, session modification, and session release) and interacts with the AMF 42, the UPF 44, or both. As will be described more below, the AMF 42, UPF 44, and/or SMF 46 may direct an incoming message (e.g., incoming packet data) to base station 12 (wherein the UT 16 is the intended recipient).

Turning now to the constellation of satellites 14 (shown in FIG. 1), in at least one example, each satellite 14 may be identical. Therefore, only one will be described in detail. Satellite 14 may comprise any suitable satellite communication equipment located in one of earth's orbits. Non-limiting satellite examples include: observation satellites, communications satellites, navigation satellites, weather satellites, space telescopes, etc. Examples of orbits include a low earth orbit (LEO) (an earth-centered orbit having an altitude between 160-2000 kilometers (km)), a medium earth orbit (MEO) (an earth-centered orbit having an altitude between 2000-35,786 km), or a high earth orbit (HEO) (an earth-centered orbit having an altitude at or above 35,786 km). Some of the HEOs may be geostationary earth orbits (GEOs)—i.e., a geosynchronous orbit (GSO) that resides above the earth's equator and matches earth's sidereal rotation period. And some HEOs may be non-geosynchronous orbits (NGSO)—e.g., in this instance, swing north and south of earth's equator, while still matching earth's sidereal rotation period. Of course, it should be appreciated that LEOs and MEOs can also be categorized as NGSO. According to one example, the satellite 14 orbits via any of LEO, MEO, or HEO (e.g., GEO, GSO, or NGSO). In another example, satellites 14 orbit only in a NGSO.

In general, communications from the base station 12 to satellite 14 may be referred to as a feeder link (e.g., also referred to as an uplink from the base station 12). And a relayed communication to the UT 16 (i.e., a communication originating at the base station 12, but sent from the satellite 14 to UT 16 may be referred to as a service link (e.g., also referred to as a downlink to the UT 16)). Collectively, each satellite communication 54 may comprise an uplink and a downlink. In one instance, a satellite communication 54 may comprise sending data from the base station 12 to the UT 16 via satellite 14. In another instance, the satellite communication 54 may comprise sending data from the UT 16 to the base station 12 via the satellite 14.

Turning now to user terminal (UT) 16, UT 16 may be any suitable end-user equipment that comprises a transceiver circuit 60 that facilitates satellite communication, a location-identification (ID) circuit 62, a processor 64, and memory 66. A few non-limiting examples of UT 16 include: a satellite telephone or other handheld device, a portable computer, a mobile satellite receiver (e.g., for receiving infotainment and/or entertainment services in a vehicle), a land, marine, or aircraft vehicle having satellite communication capability, or the like.

Transceiver circuit 60 may comprise an antenna, a satellite chipset, and any other suitable electronics arranged and configured to facilitate transmitting and receiving satellite communications 54. The circuit 60 may be coupled communicatively to processor 64, and in at least one example, processor 64 may control the transmit and receive functions of the transceiver circuit 60.

Location-ID circuit 62 may comprise any suitable electronics that determine a location report regarding the UT 16. In at least one example, the location-ID circuit 62 is operated and/or controlled by processor 64. As used herein, a location report refers to any data that provides an indication of a geographic position of the UT 16. As used herein, a geographic position refers to a geodetic or astronomic position on earth defined by a single point, having a tolerance defined by a predetermined displacement value from that single point. According to one example, a geographic position may comprise coordinate data (e.g., a latitude and longitude pair), wherein the predetermined displacement value is 10-meters (m) or less.

As will be explained more below, the location-ID circuit 62 may determine the geographic position of UT 16 or it may not. Thus, in one example, circuit 62 may comprise a global positioning system (GPS) receiver, wherein the location report is the UT's geographic position.

In another example, location-ID circuit 62 does not determine its geographic position, but instead determines a location report, sends the location report to the base station 12, and permits the base station 12 to determine its geographic position based on the location report. For example, the location report may comprise any indicia which may enable the base station 12 to determine the geographic position of the UT 16 (e.g., including but not limited to triangulation data, time-of-flight data, angle-of-arrival data, and/or any other suitable data).

In at least one example, the location report comprises a signal sent from the UT 16 to the base station 12 (e.g., a ping having a transmission timing and/or frequency information). According to this scheme, the base station 12 may estimate the geographic position of the UT 16 with sufficient accuracy based on a time-of-flight calculation (e.g., using the transmission timing and/or frequency information) and known frequency(ies) of the satellite communication 54.

Processor 64 of UT 16 comprises can be any type of device capable of processing electronic instructions, non-limiting examples including a microprocessor, a microcontroller or controller, an application specific integrated circuit (ASIC), etc.—just to name a few. As will be apparent from the description that follows, processor 64 may be programmed to carry out at least a portion of the process described herein. For example, among other things, processor 64 can be programmed to execute digitally-stored instructions which may be stored in memory 66 and which enable the UT 16 to: determine a location report; determine its current geographic position; transmit its location report and/or geographic position via satellite communication 54 to base station 12 (e.g., via satellite 14); receive (from base station 12) and store a current TAC; receive (e.g., from AMF 42) and store a tracking area list; and/or receive and store identifiers (including but not limited to an S-TMSI and an RNTI). These instructions will be described in greater detail below.

Memory 66 may comprise any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, compact disc read-only memory (CD-ROM), a digital video disc (DVD), any other optical medium, paper tape, any other physical media with patterns of holes, random-access memory (RAM), programmable read-only memory (PROM), erasable programmable read-only memory (EPROM), electrically erasable programmable read-only memory (EEPROM), any other flash memory, any other memory chip or cartridge, or any other medium from which a computer can read. As discussed above, memory 66 may store one or more computer program products which may be embodied as software, firmware, or the like.

In at least one example, UT 16 is configured to operate according to 3G (third generation), 4G (fourth generation), and/or 5G (fifth generation) telecommunication techniques. For example, UT 16 may be responsive to satellite communications 54 via an Evolved Packet Core (EPC) model or a Radio Resource Control (RRC) model. For instance, according to the former, UT 16 (when camped on a beam) may operate in a Connection Management (CM)-Connected state or a CM-Idle state. And according to the latter, UT 16 (regardless of whether camped on a beam) may operate in a RRC-Inactive state, a RRC-Connected state, or an RRC-Idle state. Each will be discussed in turn. 'Camping on' refers to the UT 16 identifying and selecting a satellite beam that has a suitably strong satellite signal (e.g., larger than a threshold signal strength).

In the CM-Connected state, UT 16 is either: (a) receiving a downlink and/or transmitting an uplink; or (b) not engaging in an uplink or downlink, wherein a predetermined time period of inactivity has not transpired. For example, a trigger for initiating the timing of the period of inactivity may be a registration (with the core network 19) or a termination of the last uplink or downlink. Following an expiration of a predetermined time period, the UT 16 may enter a CM-Idle state. This refers to UT 16 continuing to be camped on a satellite beam (although it may change beams), all the while monitoring for pages from base station 12. Thus, for example, should a page be received, UT 16 may exit the CM-Idle state (e.g., waking up) and enter the CM-Connected state so that it can engage in the satellite communication 54.

With regard to radio controls, in the RRC-Connected state, UT 16 may be engaged in a connection (similar to CM-Connected state). When UT 16 is in the RRC-Idle state, some power resources are conserved (similar to CM-Idle state). And when UT 16 is in the RRC-Inactive state, even more power may be conserved. In the RRC-Inactive state, UT 16 may monitor for pages. As used herein, a paging mode includes at least one of the CM-Idle state or the RRC-Inactive state.

Figure 2:
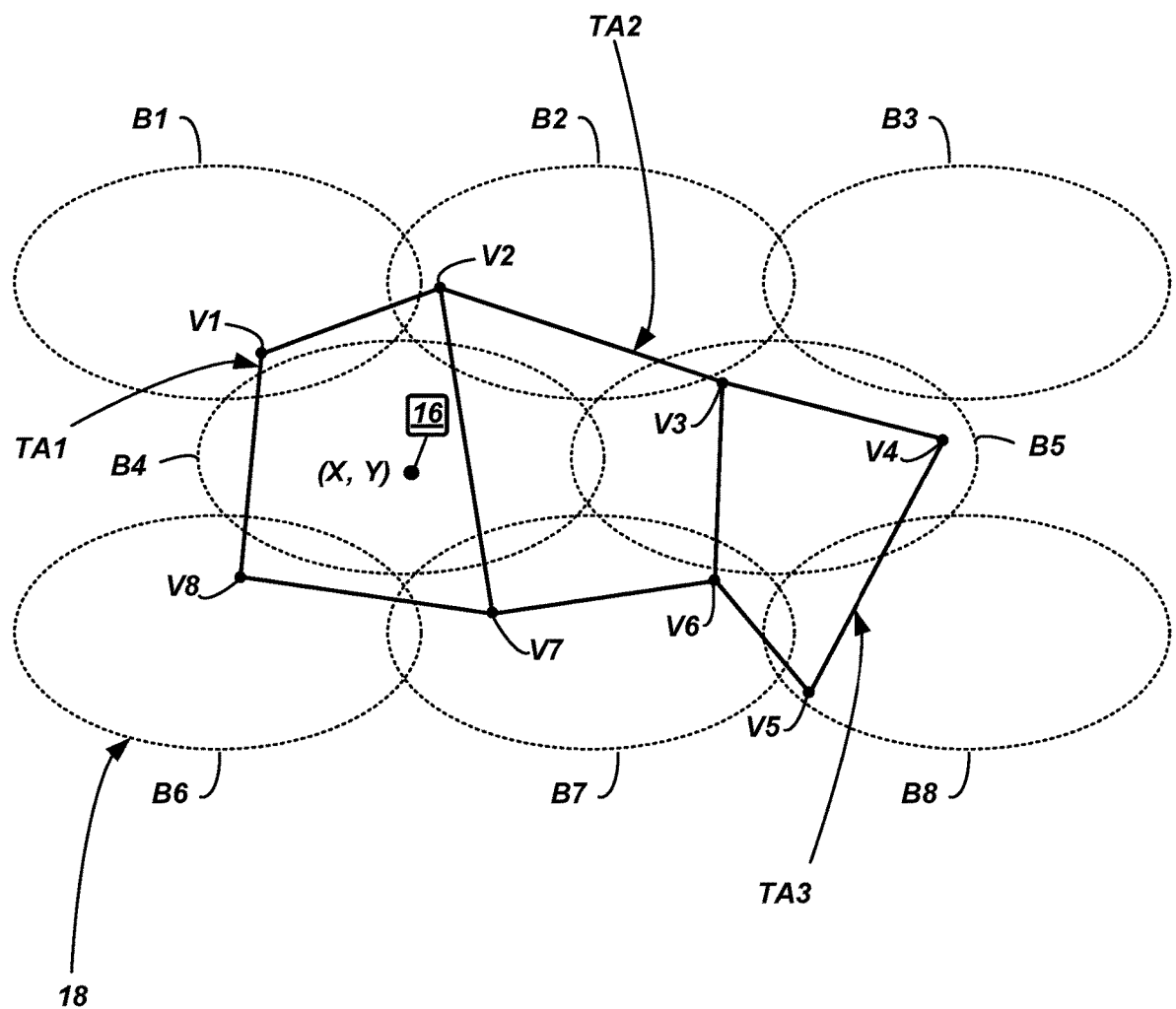
FIG. 2 illustrates a plurality of satellite beam footprints and a plurality of tracking areas, each of which overlap some of the footprints.

Turning to FIG. 2, a number of exemplary satellite beam footprints 18 are shown (e.g., labeled B1, B2, B3, B4, B5, B6, B7, and B8), wherein each footprint corresponds to a unique satellite (14). By way of example, some of the footprints B1-B8 are shown to overlap (e.g., footprint B1 overlaps with footprints B2 and B4; footprint B2 overlaps with footprints B1, B3, B4, and B5; etc.). Further, depending upon the orbit of such satellites 14, footprint B1-B8 may be stationary or may be moving relative to the ground (relative to earth).

Additionally, FIG. 2 illustrates a plurality of illustrative tracking areas (e.g., labeled TA1, TA2, TA3) defined by a terrestrial network. As used herein, a terrestrial network means a telecommunications network that provides a service region using nodes below the LEO (e.g., less than 160 km below the earth's surface). One non-limiting example of a terrestrial network is a cellular network, wherein the boundaries of the terrestrial network depend on the location of the nodes (e.g., cellular towers, eNodeBs, etc.). For example, in an LTE cellular context, a tracking area enables a mobile device (e.g., such as UT 16 or a user equipment (UE)) to move within the respective tracking area without updating a Mobility Management Entity (MME) (e.g., in 3G or a Universal Mobile Telecommunications System (UMTS), the tracking area is referred to as a 'routing area').

The shape of each illustrative tracking area may be defined by three or more vertices (e.g., FIG. 2 illustrates vertices V1, V2, V3, V4, V5, V6, V7, and V8). Tracking area TA1 is defined by vertices V1, V2, V7, and V8; and tracking area TA2 is defined by vertices V2, V3, V6, and V7; and tracking area TA3 is defined by vertices V3, V4, V5, and V6. The illustrated tracking areas are merely examples; other quantities of tracking areas may be used, and the tracking areas may have any suitable shapes and/or quantities of vertices. Also, it should be appreciated that while some of the tracking areas TA1-TA3 share vertices, this is not required. Pertinent to the discussion that follows, each of the tracking areas TA1-TA3 are predefined and stationary.

The footprints B1-B8 have a spatial relationship with the tracking areas TA1-TA3. For example, in FIG. 2, footprints B1, B2, B4, B6, and B7 overlap tracking area TA1. Similarly, footprints B2, B4, B5, and B7 overlap tracking area TA2, and footprints B5, B7, and B8 overlap tracking area TA3. Thus, it should be appreciated that-when footprints B1-B8 are moving-FIG. 2 may portray an instantaneous moment in time. Further, when footprints B1-B8 are moving, the footprint in which UT 16 resides may change-whether or not UT 16 is moving relative to earth. As will be explained more below, when UT 16 is in a CM-Connected state, UT 16 may be handed-over from one beam to another; however, when UT 16 is in a CM-Idle state, no such hand-over may occur. Conventionally, when a page (for UT 16) is received at base station 12, base station 12 may page UT 16 over multiple beams—e.g., in the illustrated example, paging may occur over beams that correspond with footprints B1, B2, B4, B5, B6, and/or B7. The process described below enables base station 12 to page UT 16 over a beam that corresponds with footprint B4, thereby minimizing throughput congestion.

Figure 3:
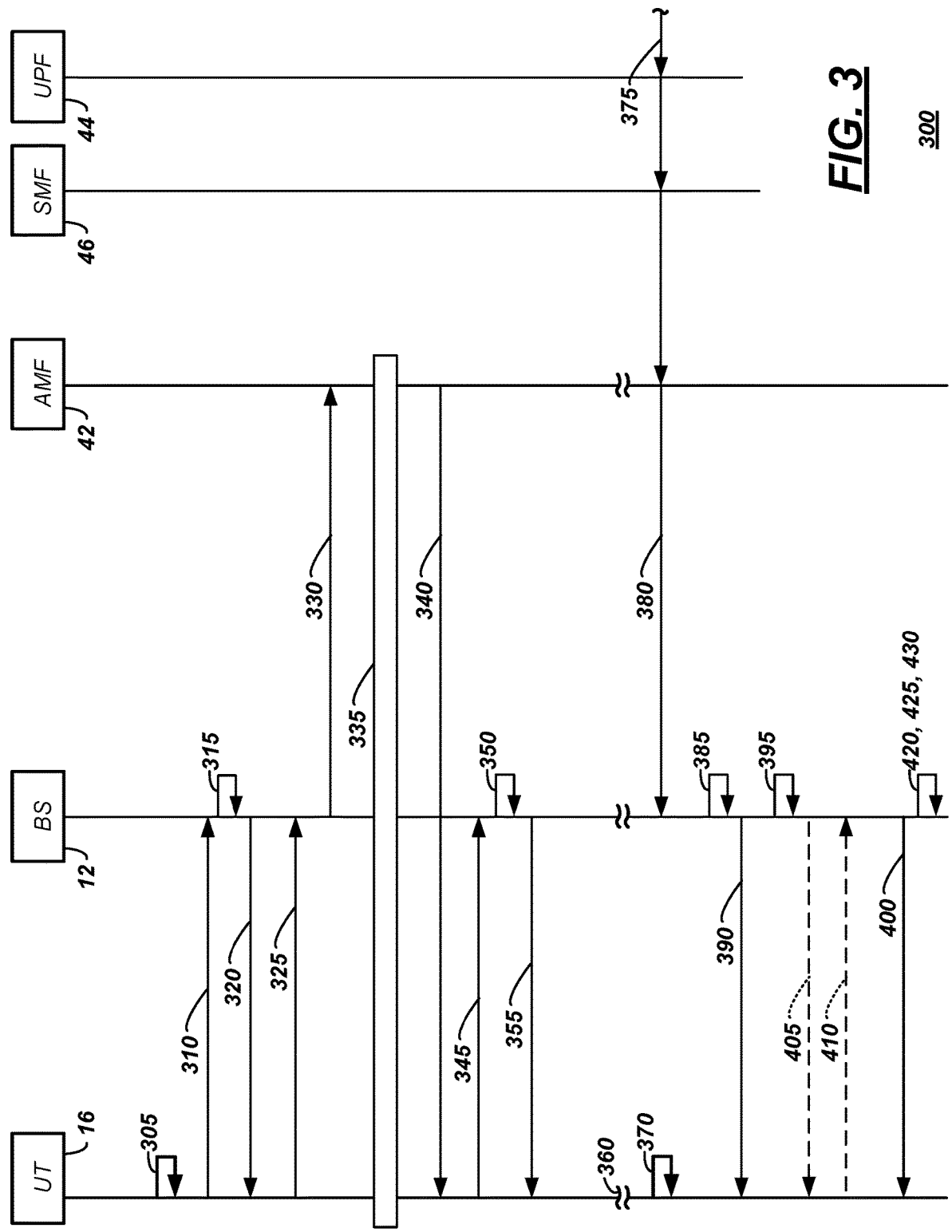
FIG. 3 is a connection flow diagram between a user terminal (UT), a satellite base station, an Access and Mobility Management Function (AMF), a User Plane Function (UPF), and a Session Management Function (SMF).

Turning now to FIGS. 3-5, a process 300 is shown for paging UT 16 and thus minimizing throughput congestion. More particularly, FIG. 3 illustrates steps of a connection flow diagram, whereas FIGS. 4-5 illustrate a flowchart diagram of an illustrative process of instructional blocks, wherein the flowchart diagram corresponds with the connection flow diagram of FIG. 3. Accordingly, like or identical reference numerals designate similar or identical functions. For sake of clarity—and not intending to be limiting—reference numerals of the process 300 will be referred to as 'blocks.'

Process 300 may begin with block 305, wherein UT 16 camps on a satellite beam. By way of example, UT 16 may camp on the beam that corresponds to footprint B4 (FIG. 2).

In block 310 which follows, UT 16 may transmit a location report to base station 12. In one example, the location report comprises a geographic position of the UT 16 (e.g., (X, Y) as shown in FIG. 2). In other examples, as discussed above, the location report may comprise other indicia of the geographic position of UT 16 (e.g., a signal with a transmission timing and/or frequency information, etc.). Block 310 also may comprise UT 16 transmitting a first identifier (e.g., its RNTI) to the base station 12.

In block 315 which follows, base station 12 determines a current tracking area code (TAC) for the UT 16; this may include first determining the geographic position of UT 16 and then determining which tracking area and corresponding TAC is associated with that geographic position.

As previously discussed, base station 12 simply may receive the geographic position of UT 16 via the location report. Or, using the techniques described above, base station computer 30 may derive or otherwise determine the geographic position of UT 16.

Once the base station 12 determines the geographic position of the UT 16, base station 12 may compare that geographic position with stored tracking area data. For example, for each tracking area, base station 12 may store in databases 36 (and/or memory 34) a TAC and a set of corresponding vertices—e.g., indexed using the respective TAC. Thus, base station 12 may determine whether the geographic position (X, Y) of UT 16 is within the geometry defined by any stored tracking area. Continuing with the previous example, using this calculation, base station 12 may determine that UT 16 is within TAL Thereafter, base station 12 may store in memory 34 the UT's geographic position, the respective TAC, and/or the first identifier (e.g., RNTI).

In block 320 which follows, the base station 12 may transmit an acknowledge (ACK) message to the UT 16. The ACK message may indicate that the base station 12 received the location report, determined the UT's geographic position, received the first identifier, or a combination thereof. Further, the ACK message may provide the UT 16 with its current TAC, and UT 16 may store this current TAC in memory 66.

In block 325 which follows, the UT 16 may transmit a registration request to the base station 12. Registration requests are generally known in the art; accordingly, this will not be described further.

In block 330—in response to receiving the registration request, base station 12 may transmit a registration request message (based on the request received from UT 16) to the AMF 42. The registration request message may comprise any conventional registration request information, as well as the first identifier of the UT 16 and its current TAC (determined by base station 12 in block 315).

Block 335 represents any remaining conventional registration procedure that may be executed between the UT 16, base station 12, and AMF 42, except that disclosed in block 340 (which follows).

In block 340, the AMF 42 transmits to the UT 16 (via the base station 12) a registration accept (RACC) message indicating that the registration procedure is complete. The RACC message includes a current tracking area (TA) list and a second identifier (e.g., S-TMSI).

It is anticipated that the UT 16 will re-initiate the registration procedure (described in blocks 325-340) if the UT 16 is no longer within one of the tracking areas defined by the current tracking area list (of course, in that procedure, the UT 16 will receive a new current tracking area list). According to one example, the UT 16 may re-register with the AMF 42 when the UT 16 determines it has moved a threshold distance (THR$_{DIST}$) (e.g., a predetermined quantity of kilometers). This re-registration is described in greater detail below.

Following block 340 (in block 345), the UT 16 may transmit a post-registration location report to the base station 12. The post-registration location report may comprise the UT's location report (which may or may not be different than that reported in block 310) and the second identifier (e.g., S-TMSI).

In block 350 which follows, base station 12 may re-determine the geographic position of UT 16 (e.g., using any of the techniques described above), re-determine the current TAC of UT 16, and store the second identifier in database 36, in memory 34, or a combination thereof.

And in block 355 which follows, base station 12 may send an ACK message to UT 16. Similar to block 320 above, the ACK message in block 355 may indicate that the base station 12 received the post-registration location report, determined the UT's geographic position, received the second identifier, or a combination thereof. Further, this ACK message also may provide the UT 16 with its current TAC (which may or may not have changed), and UT 16 may store this current TAC in memory 66.

Between block 355 and a block 370 (described below), a suitable passage of time 360 may occur, wherein the UT 16 is inactive long enough to enter the CM-Idle state. And in block 370 (which follows time 360; FIGS. 3, 5), UT 16 enters the CM-Idle state based on time 360. As discussed above, in the CM-Idle state, UT 16 may monitor for pages.

In block 375, an incoming message for UT 16 is received via the core network 19 (e.g., via UPF 44). In block 380 (which follows), the AMF 42 signals the base station 12 for paging. The AMF 42 may include, with the signal for paging, the respective UT's current tracking area list and the second identifier. Conventionally, base station 12 would not be privy to the geographic position of the UT 16—and thus, base station 12 would page the UT 16 over all of the satellite beams that currently correspond with the tracking areas provided in the list. As discussed above, this may be an unnecessary use of the resources of system 10.

In block 385, the base station 12 performs a geographic position/satellite beam correlation. As used herein, a geographic position/satellite beam correlation means to determine which satellite beam currently corresponds with a respective UT's geographic position. It should be appreciated that the geographic position used in the correlation is the last known geographic position of UT 16 (e.g., based on blocks 345-355).

Based on the geographic position/satellite beam correlation in block 385, in block 390, the base station 12 selectively pages UT 16 via the satellite beam determined in block 385 (e.g., see also footprint B4, FIG. 6). For example, base station 12 determines and communicates with one of the constellation of satellites 14 in order to relay the page to UT 16. In at least one example, this is a single satellite beam—thereby minimizing satellite communication traffic. Thus, process 300 enables the base station 12 to selectively predict which satellite beam currently covers the UT 16. Accordingly, as explained in block 390, base station 12 need only page over a single satellite beam—thereby minimizing traffic.

In block 395, base station 12 determines whether a paging response message is received from UT 16—e.g., received via a downlink from the selected satellite 14. If a paging response message is received from UT 16 within the predetermined period of time, then process 300 proceeds to block 400. And if no paging response message is received within a predetermined period of time following the page, then the process may proceed to block 405.

In block 400, base station 12 delivers the incoming message to UT 16. Prior to UT 16 receiving the incoming message, base station 12 first may establish a connection with UT 16, UT 16 may switch from the CM-Idle state to CM-Connected state, and either base station 12 or UT 16 may carry out additional suitable steps as well.

In block 405 which also may follow block 395, base station 12 may dilate the paging area. As used herein, dilation (or to dilate) refers to: (a) determining—based on a stored dilation threshold (THR$_{DIL}$)—within which satellite beam(s) the UT 16 could be (i.e., which beam(s) other than the satellite beam used to page UT 16 in block 390); and (b) paging via the determined satellite beam(s).

In one example of block 405, the dilation threshold (THR$_{DIL}$) is the last known tracking area within which the UT 16 was known to be located (e.g., based on the determined geographic position determined previously by the base station 12). For example, continuing with the example shown in FIG. 6 and also shown in FIG. 7, base station 12 may determine the dilation by correlating other satellite beams that overlap tracking area TA1 (e.g., see satellite beam footprints B1, B2, B6, and B7 which overlap TA1).

In another example of block 405, dilation threshold (THR$_{DIL}$) is a radius value, stored in memory 34, that represents how far the UT 16 can reasonably displace since its last known geographic position (e.g., which was determined by base station 12 in block 350). Processor 32 may correlate that radius value with one or more satellite beam footprints 18 and determine which additional satellite beams to page UT 16. If the radius was suitably large enough, the determined satellite beams could correspond to one or more of footprints B1, B2, B6, and B7, as well as B5 (see FIG. 7).

Returning to FIG. 5, in block 410 which follows block 405, base station 12 may determine whether a paging response message is received as a result of the dilation. If a paging response message is received, process 300 may proceed to block 400 (previously described above). And if no paging response message is received, then the process may proceed to block 420.

In block 420 which may follow either block 400 or block 410, processor 32 may determine whether to purge at least a portion of stored location reports of UT 16. In at least one example, this determination is based on a time parameter which is at least slightly larger than a Non-Access Stratum (NAS) periodic registration timer. For example, all location reports older than this time parameter may be purged from memory 34 and/or database 36. Accordingly, if location report(s) exist which are older than the time parameter (and need to be purged), then process 300 proceeds to block 425 and processor 32 purges those location reports. Or if no location reports exist which are older than the time parameter, then process 300 proceeds to block 430 and processor 32 does not purge location reports at this time. Following either of block 425 or block 430, the process 300 may end.

It should be appreciated that in instances where UT 16 remains stationary for longer than the time parameter, the base station 12 may purge the location report (and/or geographic position and first and second identifiers) of the UT 16. Therefore, according to one example, the UT 16 may be programmed to provide a location report (e.g., similar to block 350) when the UT 16 remains stationary for a duration that equates to the time parameter.

Other examples of the process 300 above also exist. For example, in one instance, when block 395 determines that no paging response message is received from UT 16, base station 12 may increase the transmission power during paging. For example, base station 12 may command the respectively-selected satellite to increase the transmission power of the page. And if this is unsuccessful, then base station 12 may dilate the paging area.

Figure 8:
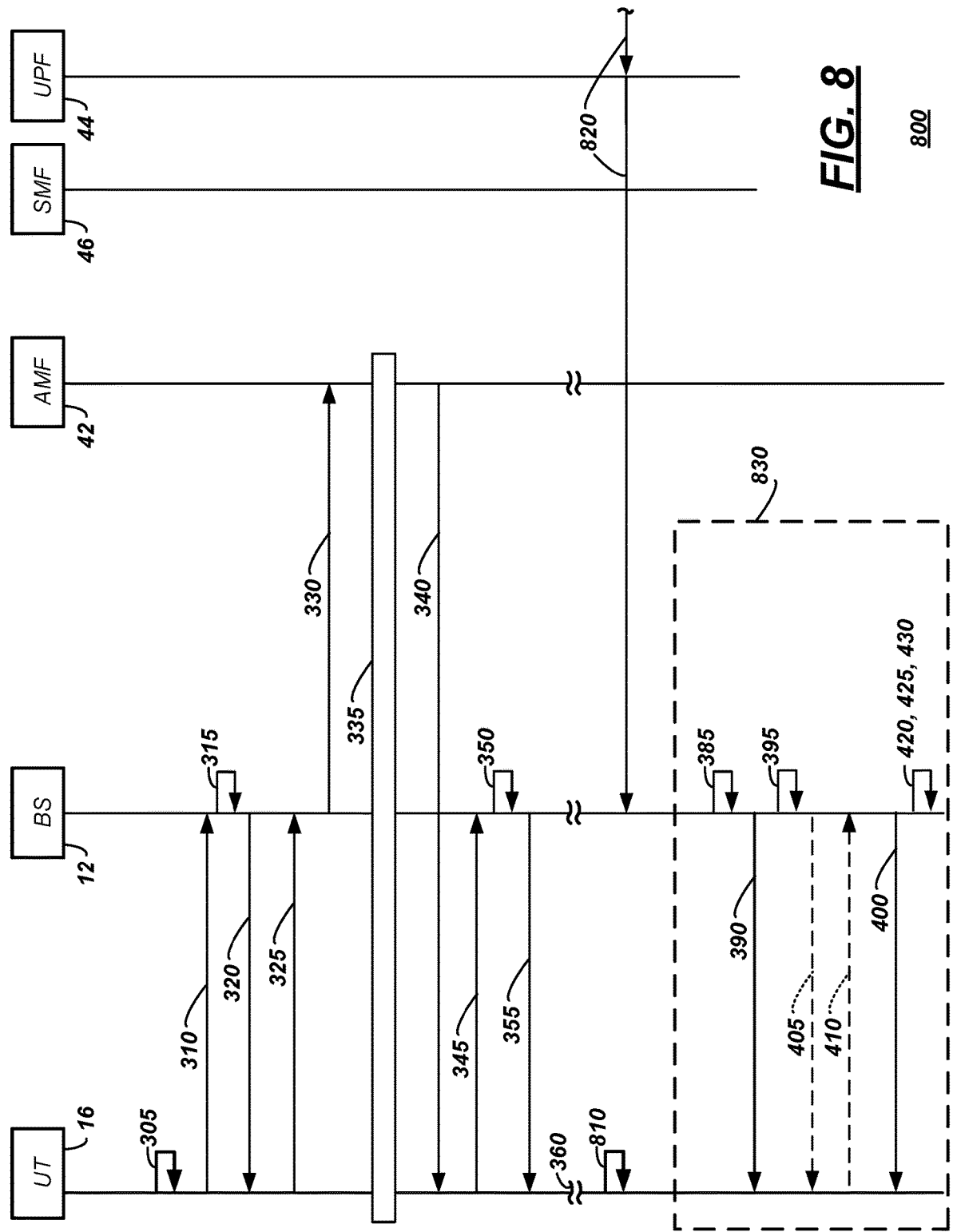
FIG. 8 is another example of a connection flow diagram between the UT, the satellite base station, the AMF, the UPF, and/or the SMF.
Figure 9:
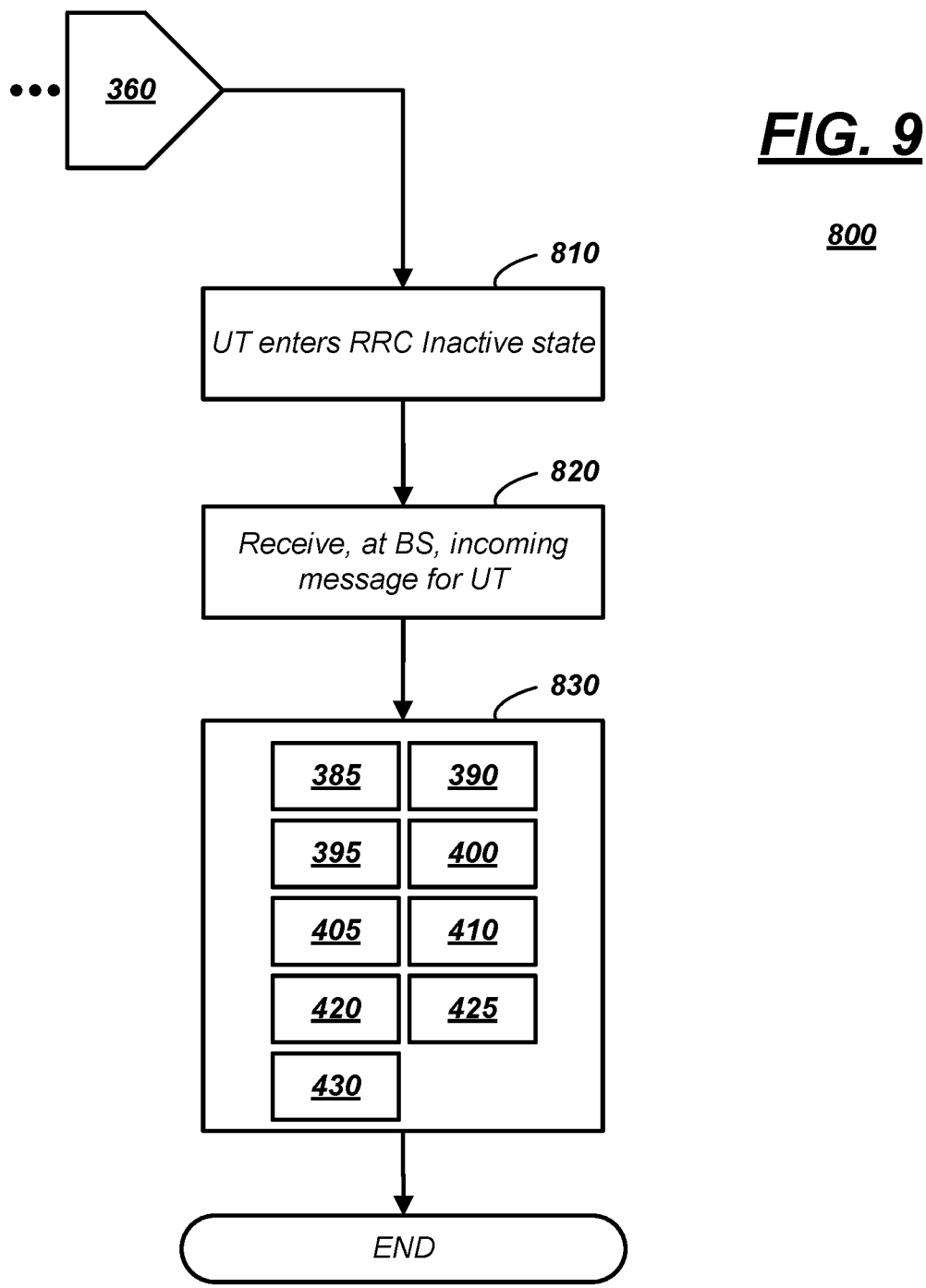
FIG. 9 is a flowchart diagram that corresponds with the connection flow diagram of FIG. 8 and that illustrates a process executed, at least in part, by the UT, the satellite base station, the AMF, the UPF, and/or the SMF.

Turning now to FIGS. 8-9, a process 800 is shown for paging the UT 16 using Radio Resource Control (RRC), also minimizing throughput congestion Like the previously-described process, FIG. 8 illustrates steps of a connection flow diagram, whereas FIG. 9 illustrates a flowchart diagram of an illustrative process of instructions blocks, wherein the flowchart diagram corresponds with the connection flow diagram of FIG. 8. Again, like or identical reference numerals designate similar or identical functions, and for sake of clarity—and not intending to be limiting—reference numerals of the process 800 will be referred to as 'blocks.'

FIG. 8 illustrates a number of blocks 305-360 (FIG. 8 only) which may be identical to those described above. Therefore, these blocks will not be re-described here. The process 800 continues with block 810, following any suitable passage of time 360 (and for sake of brevity, FIG. 9 also begins with block 810). In block 810, the UT 16 enters an RRC-Inactive state and monitors for pages from base station 12.

Block 820 follows block 810. In block 820, an incoming message for UT 16 is received by base station 12—e.g., via the UPF 44.

Following block 820, process 800 may execute block 830. Block 830 may comprise any or all of previously-described blocks 385-430. These blocks will not be re-described here. Thereafter, process 800 may end. Thus, process 800 is intended to illustrate that base station 12 and UT 16 may operate under an RRC implementation as well.

Figure 10:
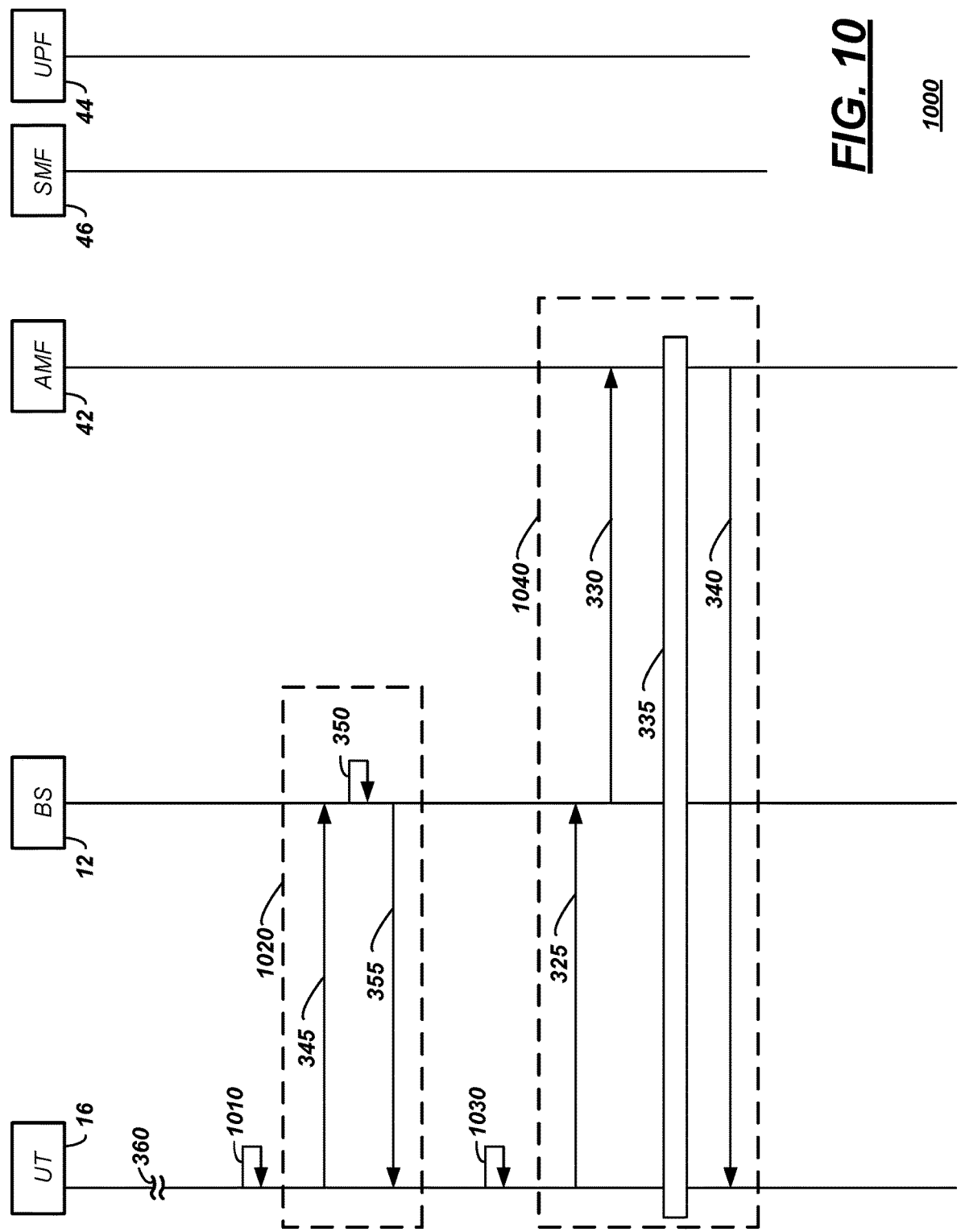
FIG. 10 is yet another example of a connection flow diagram between the UT, the satellite base station, the AMF, the UPF, and/or the SMF.
Figure 11:
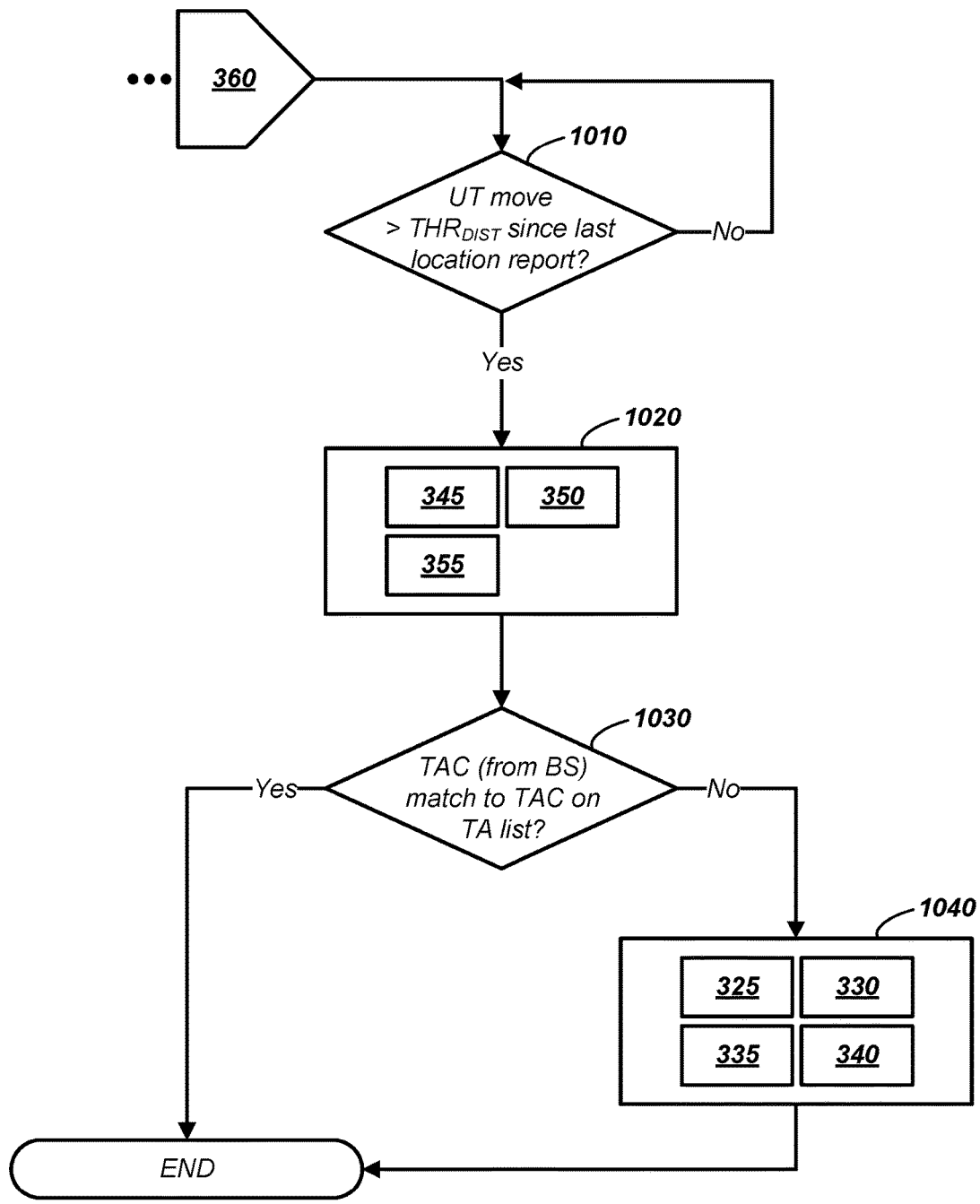
FIG. 11 is a flowchart diagram that corresponds with the connection flow diagram of FIG. 10 and that illustrates a process executed, at least in part, by the UT, the satellite base station, the AMF, the UPF, and/or the SMF.

Turning now to FIGS. 10-11, a process 1000 is illustrated for when the UT 16 moves the threshold distance ($THR_{DIST}$) since its last location report. Process 1000 may be used in combination with process 300 and/or process 800. Like the previously-described processes, FIG. 10 illustrates steps of a connection flow diagram, whereas FIG. 11 illustrates a flowchart diagram of an illustrative process of instructions blocks, wherein the flowchart diagram corresponds with the connection flow diagram of FIG. 10. Again, like or identical reference numerals designate similar or identical functions, and for sake of clarity—and not intending to be limiting— reference numerals of the process 1000 will be referred to as 'blocks.'

According to at least one example, process 1000 occurs following any suitable passage of time 360 (and for sake of brevity, FIG. 11 begins with block 1010). In block 1010, the UT 16 determines it has moved more than a threshold distance ($THR_{DIST}$) since its last location report to base station 12. In one example, it bases this determination on data from its location-ID circuit 62. In other examples, the base station 12 may report it to UT 16 (e.g., based on a periodic signal transmitted from the UT 16 that includes a transmission timing and/or frequency information). If the UT 16 determines that it has moved more than the threshold distance ($THR_{DIST}$), then process 1000 proceeds to block 1020—else, the process loops back and repeats block 1010.

In block 1020 which follows, the UT 16 may provide an updated location report to base station 12 (providing the second identifier), and base station 12 may respond providing the UT 16 its current TAC. In at least one example of block 1020, blocks 345, 350, and 355 are repeated, wherein the blocks 345-355 are identical to those explained above.

Following block 1020, UT 16 may execute block 1030 by the UT 16 determining whether the current tracking area (associated with its current TAC just provided by the base station 12) matches one of the tracking areas on the tracking area list provided to the UT 16 (e.g., previously provided in block 340). If the current TAC is matches one in the list, then process 1000 may end. However, if the current TAC does not match a TAC in the list, then process 1000 may proceed to block 1040 (e.g., to re-register).

In block 1040, the UT 16 may attempt to perform again a registration procedure (e.g., which of course includes actions by the UT 16, the base station 12, and the AMF 42). In at least one example, blocks 325, 330, 335, and 340 may be repeated—to perform the registration procedure, as explained above. This includes AMF 42 providing an updated tracking area list. Thereafter, process 1000 may end.

According to at least one example, the processes described above may be implemented by modifications to software in the UT 16 and base station 12 (e.g., in the Access Stratum) as satellite-based 5G systems (both with GSO and NGSO) start to become deployed and as terrestrial 5G standards mature. Further, no software or firmware changes are required among the core elements of the core network 19. This enables the current implementations to take advantage of a terrestrially-tested NAS protocol stack and reuse the authentication, authorization, mobility management, billing, and provisioning framework of terrestrial 5G networks. Lower layers of the protocol stack, namely, Physical Layer (PHY) and Medium Access Control (MAC) Layer that are part of the Access Stratum (AS) and implemented in Satellite RAN (SRAN) are expected to be optimized for the satellite radio environment.

Thus, there has been described a satellite communication system comprising a satellite base station that comprises a computer programmed to use a geographic position of a user terminal (UT) to minimize the quantity of satellite beams used during UT paging. The techniques described herein include novel instructions carried out by the UT, as well as novel instructions carried out by the base station.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A base station computer, comprising:
a processor and memory storing instructions executable by the processor, the instructions comprising instructions to:
determine a current geographic position of a user terminal (UT);
store the current geographic position in the memory;
determine to page the UT;
correlate a satellite beam among plurality of satellite beams based on the stored current geographic position;
receive an incoming message from the UT via a terrestrial network, the message including a tracking area list and an identifier of the UT;
based on the incoming message received via the terrestrial network, selectively page the UT via the satellite beam;
receive and store a location report from the UT;
wherein, the location report constitutes information of the UT comprising at least one of: a coordinate data indicating the current geographic position, a transmission timing, and frequency information;
re-determine the current geographic position of the UT based on the stored location report from the UT; and
upon determining, based at least in part on the stored location report, that the UT has been stationary longer than a predetermined time period greater than zero, purge the location report.

2. The computer of claim 1, wherein the instruction to determine the geographic position comprises receiving a location report from the UT.

3. The computer of claim 2, wherein the location report comprises coordinate data.

4. The computer of claim 2, wherein the location report comprises a transmission timing information from the UT, wherein the instructions further comprise, to: calculate the geographic position using the transmission timing information.

5. The computer of claim 1, wherein the instructions further comprise, to: determine a tracking area code (TAC) using the determined geographic position; and transmit the TAC to the UT.

6. The computer of claim 1, wherein the instructions further comprise, to: prior to determining to page the UT, receive another identifier from the UT; and store the another identifier with the geographic position.

7. The computer of claim 6, wherein the identifier received with the tracking area list is a System Architecture Evolution (SAE) Temporary Mobile Subscriber Identity (S-TMSI).

8. The computer of claim 1, wherein the instruction to determine to page the UT comprises receiving an incoming Radio Resource Control (RRC) message.

9. The computer of claim 1, wherein the satellite beam is associated with a satellite in a geostationary satellite orbit (GSO) or a non-geostationary satellite orbit (NGSO).

10. The computer of claim 1, wherein the instructions further comprise, to:
determine whether a paging response message is received from the UT; and
when no paging response message is received, then command an increase in transmission power during paging.

11. The computer of claim 1, wherein the instructions further comprise, to:
determine whether a paging response message is received from the UT; and
when no paging response message is received, then dilate the paging area.

12. The computer of claim 11, wherein dilating the paging area comprises an instruction to: page the UT using other satellite beams which the computer correlates to a tracking area defined by the determined geographic position.

13. A user terminal (UT), comprising:
a processor and memory storing instructions executable by the processor, the instructions comprising instructions to:
selectively camp on a satellite beam among plurality of satellite beams correlated by a base station based on a current geographic position of the UT determined and stored by the base station;
transmit a first location report to the base station via a terrestrial network to be stored by the base station;
wherein, the first location report constitutes information of the UT comprising at least one of: a first coordinate data indicating the current geographic position, a first transmission timing, and first frequency information;
transmit to the base station in an outgoing message a tracking area list of the terrestrial network and an identifier of the UT;
based on transmitting the outgoing message comprising the tracking area list and the identifier, transmit, to the base station, a second location report that comprises the identifier of the UT to be stored by the base station;
wherein, the second location report constitutes information of the UT comprising at least one of: a second coordinate data indicating a second current geographic position, a second transmission timing, and second frequency information; and
based on transmitting the second location report, receive, from the base station, a page,
wherein the base station purges the first location report upon determining based at least in part on the first and the second stored location report, that the UT has been stationary longer than a predetermined time period greater than zero.

14. The user terminal of claim 13, wherein the first or second location report comprises coordinate data indicating a current geographic position of the user terminal.

15. The user terminal of claim 13, wherein the instructions further comprise, to:
register with a core network, wherein the identifier is a System Architecture Evolution (SAE) Temporary Mobile Subscriber Identity (S-TMSI).

16. The user terminal of claim 13, wherein the page is based on an incoming message for the user terminal from a core network or wherein the page is based on an incoming Radio Resource Control message for the user terminal.

17. The user terminal of claim 13, wherein the page is received at the user terminal when the user terminal is in a Connection Management (CM)-Idle state or a Radio Resource Control (RRC)-Inactive state.

18. A method of paging a user terminal (UT) from a base station, comprising:
determining, by the base station, a current geographic position of the UT;
storing, by the base station, the current geographic position in memory;
determining, by the base station, to page the UT;
correlating, by the base station, a satellite beam among plurality of satellite beams based on the stored current geographic position;
transmitting a message from the UT via a terrestrial network to the base station, the message including a tracking area list and an identifier of the UT;
based on the incoming message received via the terrestrial network from the UT at the base station, selectively paging, by the base station, the UT via the satellite beam;
by the base station, receiving and storing a location report from the UT;
wherein, the location report constitutes information of the UT comprising at least one of: a coordinate data indicating the current geographic position, a transmission timing, and frequency information;
re-determining, by the base station, the current geographic position of the UT based on the stored location report from the UT; and
the base station, upon determining, based at least in part on the stored location report, that the UT has been stationary longer than a predetermined time period greater than zero, purge the location report.

\* \* \* \* \*